United States Patent [19]

Endoh et al.

[11] Patent Number: 4,512,237
[45] Date of Patent: Apr. 23, 1985

[54] TANDEM TYPE BRAKE POWER SERVO BOOSTER

[75] Inventors: Kazunori Endoh; Haruo Suzuki, both of Saitama, Japan

[73] Assignee: Jidosha Kiki Co., Ltd., Japan

[21] Appl. No.: 455,639

[22] Filed: Jan. 5, 1983

[30] Foreign Application Priority Data

Jan. 16, 1982 [JP] Japan .............................. 57-4141[U]
Jan. 26, 1982 [JP] Japan .............................. 57-9029[U]
Jan. 26, 1982 [JP] Japan .................................. 57-10314

[51] Int. Cl.³ .......................... F15B 9/10; F01B 19/00
[52] U.S. Cl. ................................. 91/369 A; 91/376 R; 92/48
[58] Field of Search .................... 92/48, 49; 91/369 A, 91/376 R

[56] References Cited

U.S. PATENT DOCUMENTS

| | | | |
|---|---|---|---|
| 3,083,698 | 4/1963 | Price | 91/376 R |
| 3,096,689 | 7/1963 | Kytta | 92/48 |
| 3,517,588 | 6/1970 | Kytta | 91/376 R |
| 3,603,208 | 9/1971 | Kytta | 91/376 R |
| 4,257,312 | 3/1981 | Ohmi et al. | 92/48 |

FOREIGN PATENT DOCUMENTS 415330 3/1966 Japan .

Primary Examiner—Paul E. Maslousky
Attorney, Agent, or Firm—Sughrue, Mion, Zinn, Macpeak, and Seas

[57] ABSTRACT

A tandem type brake power servo booster and toggle joint include a cylindrical member which has a first engaging portion for engaging a second engaging portion of a front power piston so that relative rotation between the cylindrical member and the front power piston can be prevented when a nut is tightened to secure the cylindrical member and the front power piston into position. In addition, a key member extends through a valve body and a hub of the cylindrical member to engage a valve plunger, and a surface of the key member which faces a push rod is spaced apart from the valve body to form a clearance between the valve body and the key member surface, thus providing the toggle joint with increased strength. In addition to the nut which serves as a stop, a second stop is formed on the hub so that the first and second stops integrally join the valve body and a center body of the cylindrical member with each other.

13 Claims, 10 Drawing Figures

TANDEM TYPE BRAKE POWER SERVO BOOSTER

BACKGROUND OF THE INVENTION

1. Field of the Invention

The present invention relates to a tandem type brake power servo booster and a tandem type brake toggle joint therefor.

2. Description of the Prior Art

A valve body enclosing a valve mechanism is usually disposed in a center of a tandem type brake toggle joint. The tandem type brake toggle joint includes a front power piston and a rear power piston which are integrally connected to the valve body. As the valve body is located on the rear side of a center plate in the tandem type brake toggle joint, the rear power piston can be integrally attached to or formed with the valve body, but the front power piston, which is located on the front side of the center plate, must extend slidably through the center plate and be connected to the valve body. Therefore, a cylindrical member which slidably extends through the center plate is usually used to connect the front power piston to the valve body.

The cylindrical member is separate from the front power piston, and the front power piston has an inner periphery which is held between a shoulder and a nut on the cylindrical member. Thus, the front power piston and the cylindrical member are connected to each other. According to this arrangement, however, the front power piston is likely to rotate with the nut when the nut is tightened. A front diaphragm is disposed behind the front power piston, and its inner peripheral portion is interposed between the piston and the shoulder on the cylindrical member to define a seal between them. If the piston is rotated when the nut is tightened, the diaphragm is deformed or twisted, thus reducing its durability. Therefore, it has been necessary in the past to use a separate O-ring and to form an annular groove in the rear surface of the front power piston so that a bead of the diaphragm can be received in the annular groove.

One feature of the present invention is the provision of a tandem type brake toggle joint which includes means for preventing rotation of the front power piston and the cylindrical member so that the front diaphragm may define an effective sealing member.

Another feature of the present invention is the provision of a connecting structure which is located between a valve body and which encloses a valve mechanism for opening and closing a passage for a pressurized fluid in response to the axial movement of the input shaft. The connecting structure also encloses a hub which is disposed in front of the valve body. The connecting structure of the present invention receives a base end of a push rod.

In the prior art tandem type brake toggle joint, a valve body which encloses a valve mechanism and a hub in which the base end of a push rod is received are formed separately from each other. Subsequently, the valve body and the hub are integrally joined to each other. In a tandem type brake toggle joint, it is necessary to form or integrally join at least the valve body, a rear power piston and a front power piston. Moreover, it is necessary to employ a cylindrical member which extends slidably through a center plate and which divides a shell into a plurality of compartments. Various constructions have, therefore, been proposed to achieve these objects. Prior art devices which have a valve body and a hub that are separately formed from each other require a correspondingly large number of parts, and a correspondingly large number of proposals have been made for improving their construction. These constructions have a significant bearing on the ease of fabrication and the degree of freedom in design engineering.

A further feature of the present invention is that a valve body which encloses a valve mechanism for opening or closing a passage for a pressurized fluid in response to an axial movement of an input shaft, and a key member by which a valve plunger which forms a part of the valve mechanism is held in position in the valve body, are always kept apart from each other so that the valve body may be reduced in size and weight.

In a conventional tandem type brake toggle joint, the valve body which encloses the valve mechanism is formed separately from a hub in which the base end of a push rod is received. The hub has a base end which is fitted in the valve body, and the valve plunger is slidably fitted in the base end of the hub. A key member extends through the valve body and the hub and engages the valve plunger to hold it in position within the hub.

The valve body, which is formed from a synthetic resin, is likely to crack if its wall thickness is reduced in order to decrease the size and weight of a brake toggle joint. Detailed examinations have been made of the possible causes of cracking in the prior art tandem type brake toggle joint, and it has been found that the valve body cracks if a stepping force, which exceeds the level required to bring the brake toggle joint into a full load position, is applied to the valve plunger through the input shaft and transmitted to the valve body through the key member.

The last-mentioned aspect of the present invention is based on this discovery, and this aspect of the invention is characterized by the provision of the clearance between the key member and the valve body so that they may always be kept away from each other.

SUMMARY OF THE INVENTION

The present invention is intended to solve the above-identified problems in the prior art. According to the present invention, the tandem type brake power servo booster is constructed to include a valve body; a rear power piston which is disposed on said valve body; a cylindrical member which is provided on said valve body; a front power piston which is disposed on the cylindrical member, with an inner peripheral edge of the front power piston being engaged with a shoulder of the cylindrical member; and a nut which is fitted about the cylindrical member and which cooperates with the shoulder in housing the front power piston in position, the cylindrical member having an engaging means which engages with a second engaging means of the front power piston to connect the cylindrical member and the front power piston in such a manner that the cylindrical member and the front power piston are prevented from rotating relative to each other when the nut is tightened.

In addition, the present invention discloses a tandem type brake toggle joint which includes a valve body which encloses a valve mechanism for opening and closing a passage for a pressurized fluid in response to an axial movement of an input shaft; a hub which is disposed in front of the valve body; a push rod which has a base end fitted within said hub; a front power piston and a rear power piston which are operated by a fluid pressure from the valve mechanism to transmit a thrust to said push rod; a first stop means which is located on a rear of the hub for preventing any frontward displacement of the hub; a center body which surrounds the hub so that it extends slidably through a center plate; and a second stop means which is provided at the front of the hub is such a manner that the first and second stop means integrally join the valve body and the center body with each other.

Finally, according to the invention, a key member extends through the valve body and the hub so that it engages a valve plunger, and a surface of the key member which faces a push rod is spaced apart from the valve body to form a clearance between them, thus keeping the valve body and the surface of the key member apart from each other.

DESCRIPTION OF THE PREFERRED EMBODIMENTS

Figure 1:
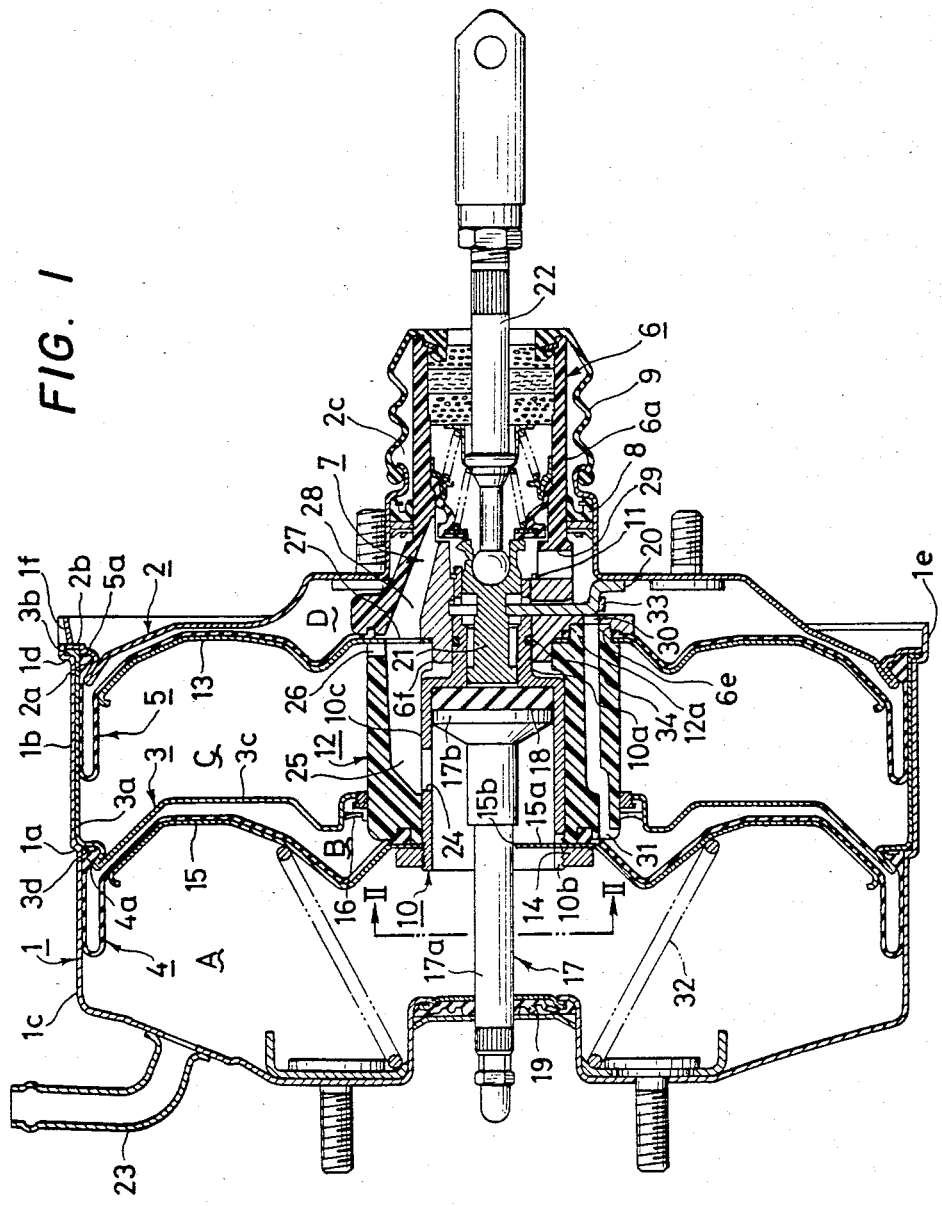
FIG. 1 is a sectional view taken along I—I of FIGS. 2, 3, 5 and 6, except for the key 20, and which shows a first embodiment of the present invention.

A first feature of the present invention will be described by referring to FIG. 1. In FIG. 1, a front shell 1 and a rear shell 2 define a closed container which is divided into four compartments (A to D) by a center plate 3, a front diaphragm 4 and a rear diaphragm 5. The front shell 1 is generally shaped like a cup and provided with a shoulder 1a in its longitudinal mid-portion. The shoulder 1a defines a medium-diameter cylindrical portion 1b which extends toward the open end of the shell 1 and a small-diameter cylindrical portion 1c which is located on the opposite side of the shoulder 1a from the medium-diameter cylindrical portion 1b. The medium-diameter cylindrical portion 1b has an open end which is formed with a shoulder 1d and which defines a large-diameter cylindrical portion 1e.

The center plate 3 is shaped like a cup and has a depth which is about half of the depth of the front shell 1, and it has a cylindrical portion 3a which is fitted within the medium-diameter cylindrical portion 1b of the front shell 1. The cylindrical portion 3a has an open end which is formed with a radially outwardly extending flange 3b which abuts the shoulder 1d to hold the center plate 3 in position. The center plate 3 has an end wall 3c, and substantially radially outwardly facing annular groove 3d is formed between the cylindrical portion 3a and the end wall 3c. The front diaphragm 4 has an outer peripheral bead 4a which is held between the inner surface of the annular groove 3d and the inner surface of the small-diameter portion 1c of the front shell 1 to maintain a gastight seal between these elements.

The rear shell is generally shaped like a dish and has an outer periphery which is formed with an annular groove 2a, the annular groove 2a being similar to the annular groove 3d. The outer peripheral edge of the rear shell 2, which is contiguous to the groove 2a, terminates in a radially outwardly extending flange 2b. The rear diaphragm 5 has an outer peripheral bead 5a which is held between the inner surface of the annular groove 2a and the inner surface of the cylindrical portion 3a of the center plate 3 to maintain a gastight seal between these elements. The flange 2b of the rear shell 2 lies on the flange 3b of the center plate 3, and the flange 2b has an outer surface which is supported by a plurality of projections 1f, which are formed on the large-diameter portion 1e of the front shell 1, so that the rear shell 2 may not be detached from the front shell 1.

A valve body 6, which is formed from a synthetic resin, encloses a conventionally known valve mechanism 7, and the valve body 6 has a cylindrical portion 6a which slidably extends outwardly through a sealing member 8 and the open end 2c of the axial portion of the rear shell 2. A dust cover 9 extends between the open end 2c of the rear shell 2 and the outer end of the cylindrical portion 6a, and a metallic reaction disk hub 10 has a right-hand, reduced-diameter portion 10a which is slidably fitted into the central portion of the valve body 6. The reduced-diameter portion 10a terminates in a stop 11 which is engaged with a shoulder on the valve body 6 so that the hub 10 may not be displaced to the left, and a synthetic resin center body 12 is slidably fitted about the hub 10. The inner peripheral edges of the rear diaphragm 5 and a rear power piston 13 are held between the right-hand end surface of the center body 12 and the left-hand end surface of the valve body 6, and the inner peripheral edges of the front diaphragm 4 and a front power piston 15 are held between the left-hand end surface of the center body 12 and a nut 14 which is threadedly fitted about the hub 10. The nut 14 is tightened to hold the valve body 6, the rear diaphragm 5, the rear power piston 13, the center body 12, the front diaphragm 4 and the front power piston 15 together between the stop 11 and the nut 14. The center body 12 extends slidably through the center of the center plate 3, and a sealing member 16 is provided around the center body 12.

Figure 2:
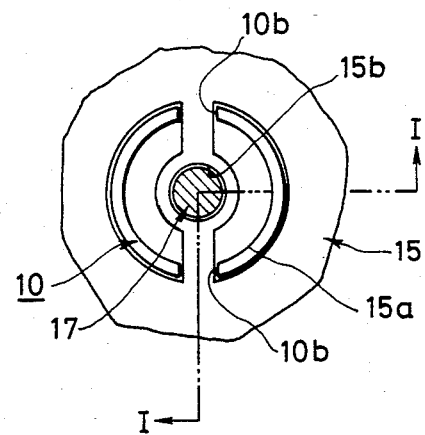
FIG. 2 is a sectional view taken along line II—II of FIG. 1.

A pair of recesses 10b are formed on the end of the hub 10 on which the nut 14 is fitted. A projection 15a is formed on the inner periphery of the front power piston 15, and the projection 15a is engaged in the recesses 10b to prevent rotation of the front power piston 15 and twisting of the front diaphragm 4 when the nut 14 is tightened. FIG. 2 is a sectional view taken along the line II—II of FIG. 1, and this figure shows the two recesses 10b in diametrically opposite relation to the hub 10. The projection 15a of the front power piston 15 connects the two recesses 10b, and the projection 15a has a hole 15b in its mid-portion through which the rod portion 17a of a push rod 17 extends loosely. The push rod 17 has a large-diameter base portion 17b which is slidably fitted within a large-diameter portion 10c of the hub 10, and the large-diameter base portion 17b abuts an end surface of a reaction disk 18 which is fitted within the large-diameter portion 10c, as shown in FIG. 1. The rod portion 17a has an outer end which slidably extends through the center of the front shell 1, and a sealing member 19 is provided on the rod portion 17a.

As the hub 10 and the front power piston 15 are integrally connected to each other by the engagement of the projection 15a with the recesses 10b, the piston 15 does not rotate with the nut 14 when the nut 14 is tightened. Accordingly, the front diaphragm 4, which is disposed on the rear surface of the piston 15, is not twisted when the nut is turned, and it is possible to prevent any decrease in the durability of the diaphragm that would occur if it were twisted. As the rod portion 17a of the push rod 17 extends through the hole 15b of the projection 15a, it is possible to prevent any detachment of the large-diameter portion 17b of the push rod 17 from the large-diameter portion 10c of the hub 10.

Figure 4:
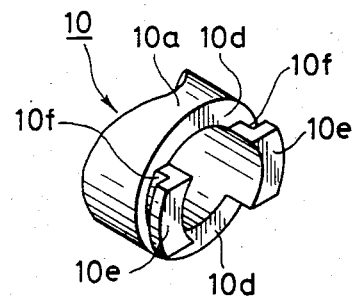
FIG. 4 is a perspective view showing the right-hand end of the hub 10.
Figure 3:
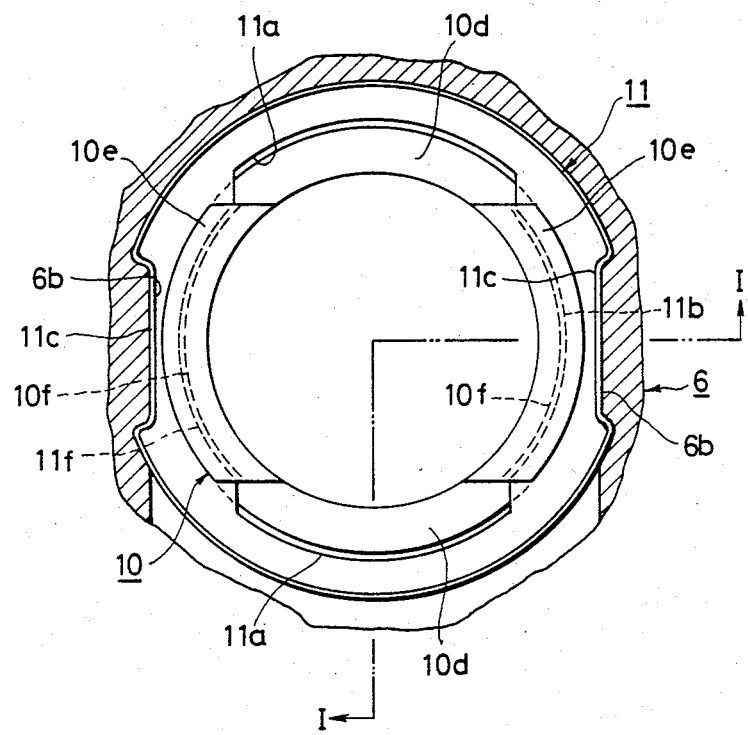
FIG. 3 is a front elevational view showing the connection between the reaction disk hub 10 and the stop 11 in the apparatus of FIG. 1.

When the stop 11 is attached to the hub 10, it is fitted about the outer periphery of the hub 10 at its end and turned by 90°. As shown in FIGS. 3 and 4, the end of the hub 10 has a pair of diametrically opposite recesses 10d, a pair of projections 10e which are located between the recesses 10d, and a pair of grooves 10f which are formed along the outer periphery of one of the projections 10e and in which the stop 11 is engageable. The stop 11 is generally ring-shaped, and it is provided along its inner periphery with a pair of recesses 11a which enable the projections 10e of the hub 10 to pass when the end of the hub 10 is inserted in the stop 11. A pair of projections 11b are received in the grooves 10f when the stop 11 has been turned by 90°.

The stop 11 has a pair of recesses 11c along its outer periphery, while the valve body 6 has a pair of axially extending projections 6b in its inner surface. The projections 6b are engaged in the recesses 11c to prevent rotation of the stop 11 relative to the valve body 6. A key 20 extends radially through the valve body 6 and the hub 10 to prevent rotation of the hub 10 relative to the valve body 6, as shown in FIG. 1, and the key 20 holds a valve plunger 21 in position. The valve plunger 21 is slidably fitted into a reduced-diameter portion 10a of the hub 10, and the valve plunger 21 has a bifurcated end which connects with an end of an input shaft 22. The input shaft 22 is associated with a brake pedal (not shown), while the other end of the plunger faces the end surface of the reaction disk 18. A holding ring 33 is provided for holding the key 20 to the valve body 6, and the plunger 21 forms a part of the valve mechanism 7.

The compartment A communicates with an intake manifold (not shown) by a negative pressure pipe 23 which is connected to the front shell 1. The compartment A is maintained in communication with the compartment C through a hole 24 in the large-diameter portion 10c of the hub 10, a first passage 25 in the center body 12, and a lateral hole 26 which is connected to the passage 25. When the brake toggle joint is not in operation, the compartments A and C are in communication with the compartment D through a hole 27 in the rear power piston 13, a passage 28 in the valve body 6, the clearance between a valve member and a valve seat in the valve mechanism 7, and a radial passage 29 in the valve body 6. The compartments A and C are also in communication with the compartment B through a passage 30 in the valve body 6 and a second passage 31 in the center body 12. Under these circumstances, all of the compartments, A to D, receive an equal negative pressure. Accordingly, there is no pressure difference between the opposite sides of either of the diaphragms 4 and 5. The diaphragms 4 and 5 are maintained in their inoperative position by a return spring 32, as shown in FIG. 1.

As is obvious from the communicative relationship described above, the first and second passages 25 and 31 in the center body 12 must be connected with the passages 28 and 30, respectively, in the valve body 6. Also, a sealing member is required for separating, in a gastight manner, the passages which must not be connected to each other. According to the present invention, this sealing member is defined by a part of the rear diaphragm 5, thus providing a simple construction and making assembly easy.

Figure 5:
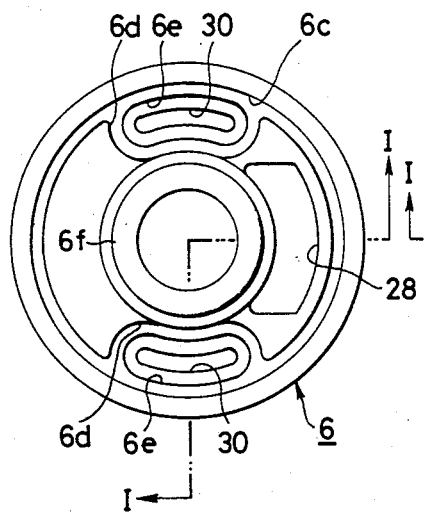
FIG. 5 is a front elevational view showing the left-hand end of the valve body 6 in the apparatus of FIG. 1.
Figure 6:
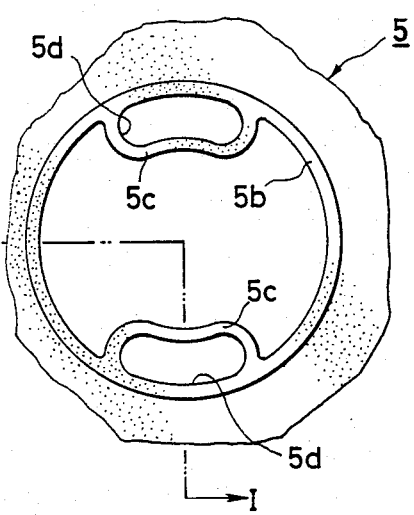
FIG. 6 is a front elevational view of the inner periphery of the rear diaphragm 5 placed on the left-hand end of the valve body 6.

FIG. 5 is a front elevational view showing the left-hand end surface of the valve body 6, and FIG. 6 is a front elevational view showing the inner periphery of the rear diaphragm 5 which is placed on the left-hand end surface of the valve body 6. The left-hand end surface of the valve body 6 contains a large-diameter annular groove 6c which surrounds the passages 28 and which communicates with the first passage 25 in the center body 12. A pair of small-diameter annular grooves 6d are connected to the annular groove 6c, and each of the small-diameter annular grooves 6d surrounds one of a pair of passages 30. The pair of passages 30 communicates with a pair of second passages 31.

Each passage 30 in the valve body 6 has an enlarged end opening which defines an engaging recess 6e. As shown in FIG. 1, the right-hand end surface of the center body 12 is formed with a projection 12a for engaging the recess 6e to hold the valve body 6 and the center body 12 in position relative to each other. The valve body 6 has only a single passage 28 since a hole for the key 20 is formed on the opposite side of the valve body center from the passage 28. The center body 12 has a pair of first passages 25 which are symmetric with respect to its center so that no problem is encountered, even if the center body 12 is displaced by 180° when it is connected to the valve body 6.

As shown in FIG. 6, an inner peripheral bead of the rear diaphragm 5 has sealing edges 5b and 5c which are aligned with the annular grooves 6c and 6d. The sealing edges 5c engage the small-diameter annular grooves 6d to define holes 5d in which the projections 12a of the center body 12 are engaged. An inner periphery of the rear power piston 13 extends to the outer periphery of an annular projection 6f which is formed on the left-hand end of the valve body 6, as shown in FIG. 1. The rear power piston 13 is provided with a pair of holes in which the projections 12a of the center body 12 are received, as well as with a pair of symmetric holes 27.

The joints between the passages 30 and the second passages 31 are sealed by the sealing edges 5c on the rear diaphragm 5. The joints between the first passages 25 and the passages 27 are sealed by the sealing edges 5b and 5c on the rear diaphragm 5, as well as by a sealing member 34 which is provided on the reduced diameter portion 10a of the hub 10.

No description will be made in this application of the operation of the apparatus which is actuated by the valve mechanism 7 since it is the same as that of the prior art tandem type brake toggle joint.

In the apparatus described above, the hub 10 and the center body 12 define a cylindrical member which connects the front power piston 15 to the valve body 6, and the front diaphragm 4 and the front power piston 15 are held together at the front end of the center body 12. It is, of course, possible to use a single cylindrical member rather than using both the hub 10 and the center body.

Figure 7:
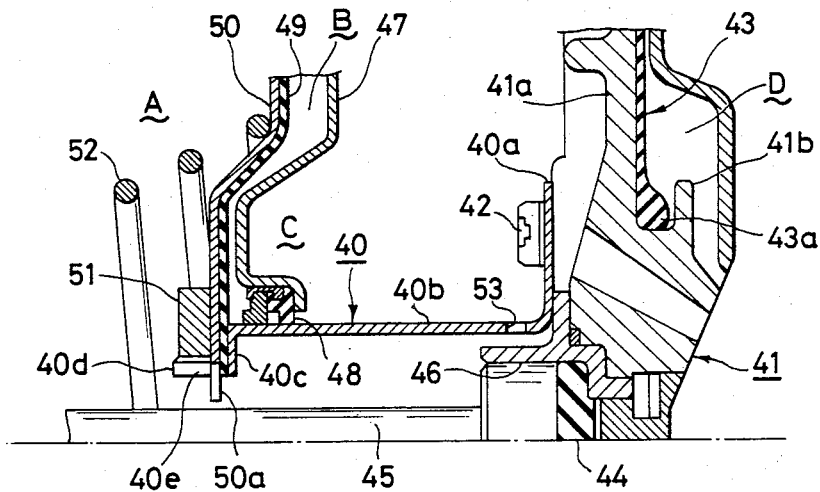
FIG. 7 is a sectional view showing a second embodiment of the present invention.

FIG. 7 shows an embodiment which has a unitary cylindrical member 40. The cylindrical member 40 has a radially outwardly extending flange 40a formed at one end, and the flange 40a is secured to a valve body 41 by screws 42. The valve body 41 includes an integral rear power piston 41a. The valve body 41 has an annular groove 41b formed behind the piston 41a, and the inner peripheral bead 43a of a rear diaphragm 43 is engaged in the annular groove 41b. A hub 46, in which a reaction disk 44 and the base end of a push rod 45 are received, is secured between the flange 40a and the valve body 41.

The cylindrical member 40 comprises a cylindrical body 40b which slidably extends through a sealing member 48 on a center plate 47. An opposite end of the cylindrical member 40 has a shoulder 40c which defines a reduced-diameter portion 40d. The reduced-diameter portion 40d extends through the center of a front diaphragm 49 and a front power piston 50, and it contains a recess 40e in which a projection 50a on the front power piston 50 is engaged so that the cylindrical member 40 and the piston 50 may not rotate relative to each other. A nut 51 is fitted about the reduced diameter portion 40d and cooperates with the shoulder 40c in holding the front diaphragm 49 and the front power piston 50 between them.

FIG. 7 also shows a return spring 52 and compartments A to D which correspond to the compartments A to D in FIG. 1. The compartments A and C are in communication with each other through a hole 53 in the cylindrical member 40, and the compartments B and D are in communication with each other through a passage (not shown) which extends between the outer peripheries of the rear diaphragm 43 and the center plate 47.

Other means can be employed for preventing rotation of the cylindrical member and the front power piston relative to each other. For example, it is possible to provide an axial groove in the outer surface of the cylindrical member and a complementary projection on the front power piston.

Figure 8:
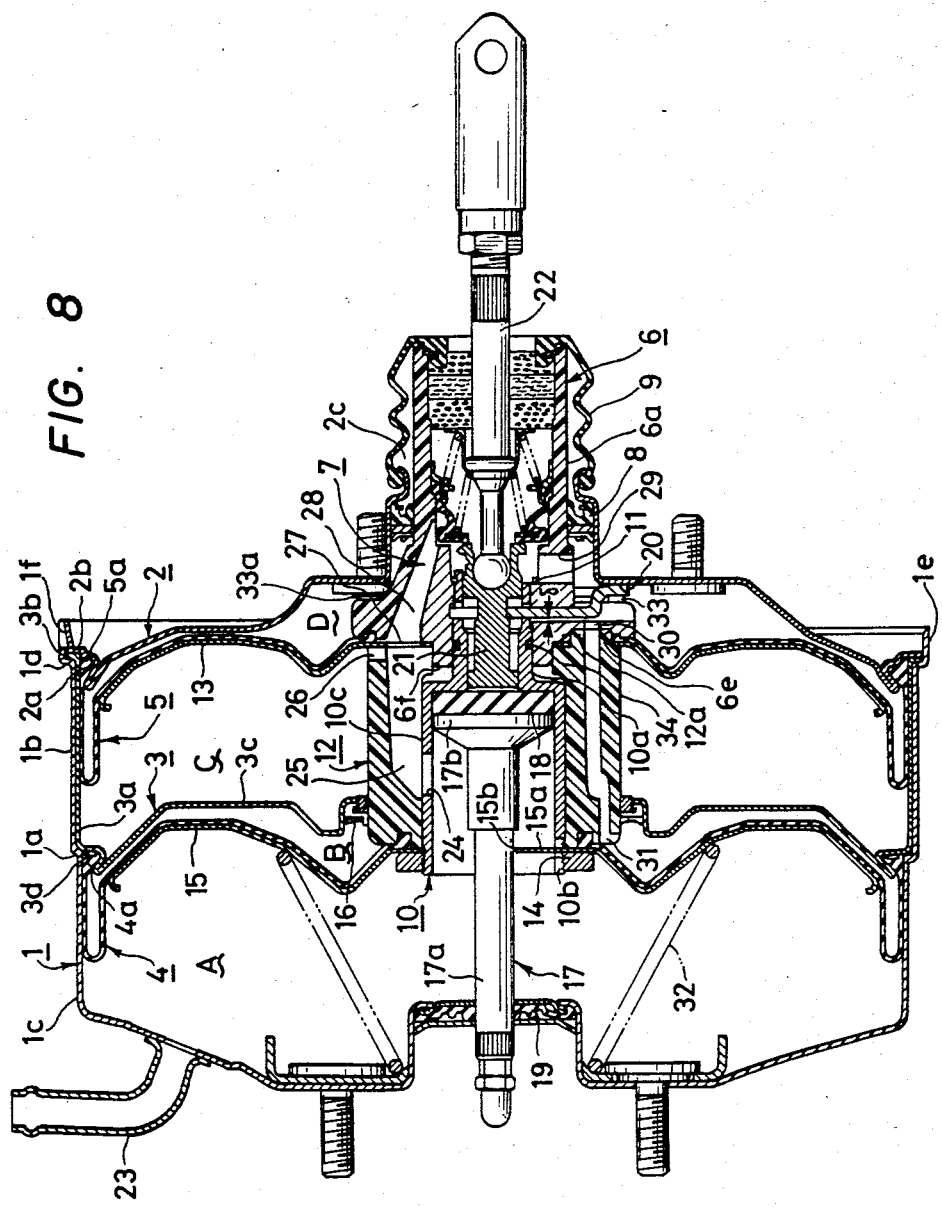
FIG. 8 is a longitudinal sectional view showing another embodiment of the present invention.
Figure 9:
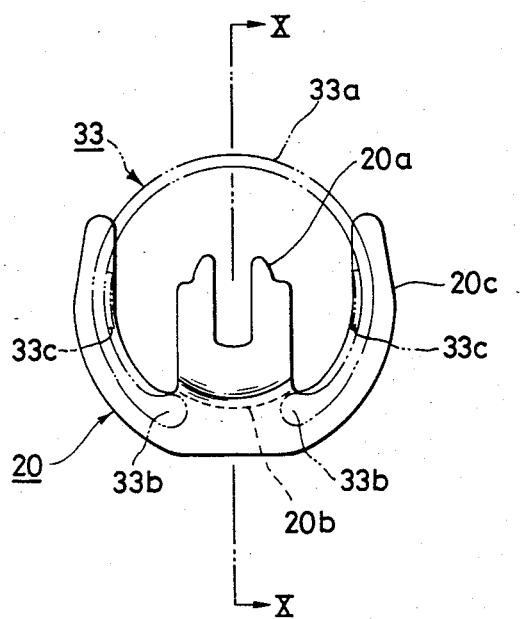
FIG. 9 is a front elevational view illustrating the engagement between a key member 20 and a holding ring 33.
Figure 10:
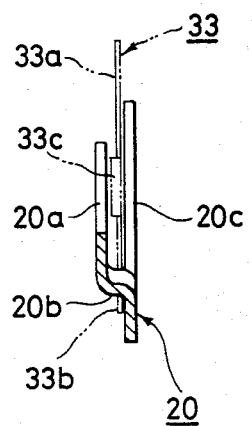
FIG. 10 is a sectional view taken along line X—X of FIG. 9.

Referring to FIG. 8, according to yet another feature of the present invention, a predetermined amount of clearance δ is always maintained between the valve body 6 and that surface of the key member 20 which faces the push rod 17. A holding ring 33 is provided for holding the key member 20 against the valve body 6. The key member 20 and the holding ring 33 are shown in detail in FIGS. 9 and 10. The key member 20 has a bifurcated engaging portion 20a which extends through the valve body 6 and the hub 10, and the bifurcated engaging portion engages the reduced-diameter portion of a valve plunger 21. The key member 20 also has a bent portion 20b which is folded from the engaging portion 20a in crank form, as well as a pair of arcuate portions 20c which extend from the opposite ends of the bent portion 20b along the circumference of the valve body 6. The holding ring 33 has a C-shaped body 33a which is formed from spring steel, and a holding portion 33b which is formed at each end of the body 33a, and a pair of engaging portions 33c which are formed on the body 33a and which extend axially of the valve body 6. As shown in FIGS. 9 and 10, the holding ring 33 is fitted about the valve body 6 and disposed between the valve body 6 and the arcuate portions 20c of the key member 20 so that holding portions 33b may hold the key member 20 against the valve body 6. The projections 33c engage in grooves (not shown) which are formed on the end surface of the valve body 6 so that the ring 33 cannot rotate relative to the valve body 6.

Upon operation of the valve mechanism 7 by the input shaft 22, atmospheric pressure is introduced into the compartments B and D to advance the valve body 6 and the center body 12, thus transmitting a thrust to the push rod 17, as is the case with any conventional tandem type brake toggle joint. In the medium-load range of the device, the valve plunger 21 is in the switchover position in which the compartments B and D are connected with either the open atmosphere or the compartment A. Therefore, the stepping force which is applied by the brake pedal to the valve plunger 21 is not continuously transmitted to the key member 20.

When the brake toggle joint is in its full load position, the advance of the valve plunger 21 is prevented by the key member 20, and the stepping force which is applied to the valve plunger 21 is continuously transmitted to the key member 20. The key member 20 has conventionally been supported on the valve body 6, which is formed from a synthetic resin, and the key member 20 has conventionally caused the valve body 6 to crack when its wall thickness is reduced. According to the present invention, however, the clearance δ is maintained between the valve body 6 and the key member 20, and the stepping force bears on the hub 10 which is made of a metal. Therefore, the valve body 6 does not crack, even if its wall thickness is reduced.

According to this aspect of the present invention, a clearance is always maintained between the valve body and that surface of the key member which faces the push rod so that the valve body and that surface of the key member may be kept away from each other. Thus, the valve body is not likely to crack, even if it is reduced in size and weight.

According to the first feature of the present invention, it is possible to prevent rotation of the front power piston when the nut 51 is tightened. Therefore, the inner peripheral portion of the front diaphragm can be effectively utilized as a sealing member without being twisted and without encountering the reduction in its durability that would occur if it were twisted.

In addition, the present invention provides a novel tandem type brake toggle joint which is easy to assemble and which allows for a wide range of freedom in design engineering. According to the present invention, a hub has a relatively large axial length, and a center body is disposed about the hub. The hub and the center body define a cylindrical member which extends slidably through a center plate, and the hub defines a connecting member containing a first stop and a second stop which join the center body integrally to the valve body. This arrangement enables the parts around the valve body to be preliminarily assembled and integrally joined together by the second stop 14 which faces a front power piston. Accordingly, the fabrication of the toggle joint of the present invention and, in particular, those parts located on the side of a rear power piston, is easier and more efficient than the fabrication of the prior art toggle joints. The provision of the center body 12 in the present invention imparts an improved freedom in design engineering since it is, for example, possible to form an air passage in the center body.

Although the first stop 11 is separately formed from the hub 10 in the apparatus described above, they may also be formed as a unitary part. In the event that they are formed as a unitary part, means similar to the projections 6b shown in FIG. 3 may be provided for allowing insertion of the stop 11 through the front end of the valve body 6 and for preventing detachment of the hub 10 when it is rotated by 90°, and the key 20 may be used to prevent any further rotation of the hub. The stop 11 is not always required, and the key 20 may also serve as a substitute for the stop 11. A snap ring or the like may be used as the second stop means, in place of the nut 14.

As is obvious from the foregoing description, the present invention improves fabrication and increases the degree of freedom in design engineering for a tandem type brake power servo booster and the toggle joint therefor.

We claim:

1. A tandem type brake power servo booster, comprising:
   a valve body;
   a rear power piston disposed on said valve body;
   a cylindrical member provided on said valve body;
   a front power piston disposed on said cylindrical member, said cylindrical member having a shoulder engaged with an inner periphery of said front power piston;
   a nut fitted about said cylindrical member and cooperating with said shoulder and holding said front power piston in position;
   a first engaging means located on said cylindrical member;
   second engaging means located on said front power piston for engaging said first engaging means to connect said cylindrical member and said front power piston in such a manner that said cylindrical member and said front power piston are prevented against rotating relative to one another when said nut is tightened; and
   wherein said cylindrical member further comprises a metallic reaction disk hub having a reduced diameter portion slidably fitted within a central portion of said valve body and also comprises a center body slidably fitted about said hub.

2. The power servo booster as claimed in claim 1 wherein said first engaging means comprises a pair of diametrically opposed recesses formed on said cylindrical member.

3. The power servo booster as claimed in claim 1 further comprising a reaction disk, and a rod, said rod having a large diameter portion slidably fitted within a large-diameter portion of said cylindrical member so as to abut against said reaction disk.

4. The power servo booster as claimed in claim 1 further comprising a valve mechanism disposed in said valve body, said valve body being made of a synthetic resin and slidably extending through an open end of a rear shell of said tandem type brake power servo booster.

5. A tandem type brake toggle joint, comprising:
   an input shaft;
   a valve body;
   a valve mechanism enclosed within said valve body for opening and closing a passage for a pressurized fluid in response to an axial movement of said input shaft;
   a hub disposed in front of said valve body;
   a push rod having a base end fitted within said hub;
   a front power piston and a rear power piston operated by said fluid pressure from said valve mechanism to transmit a thrust to said push rod;
   first stop means provided on a rear of said hub for preventing any frontward displacement of said hub relative to said valve body;
   a center body surrounding said hub and extending slidably through a center plate; and
   second stop means provided at the front end of said hub, said first and second stop means joining said valve body and said center body integrally with each other.

6. The toggle joint as claimed in claim 5 wherein said first stop means has a pair of recesses along an outer periphery thereof, and said valve body has a pair of axially extending projections on an inner surface thereof, said projections being engaged in said recesses to prevent rotation of said first stop means relative to said valve body.

7. The toggle joint as claimed in claim 6 further comprising a key which extends radially through said valve body and said hub to prevent rotation of said hub relative to said valve body.

8. The toggle joint as claimed in claim 7 further comprising a valve plunger slidably fitted in a reduced diameter portion of said hub, said valve plunger having a bifurcated end connected to an end of said input shaft, an opposite end of said valve plunger facing an end surface of a reaction disk, said key holding said valve plunger in place.

9. The toggle joint as claimed in claim 8 further comprising a holding ring for holding said key to said valve body.

10. A tandem type brake toggle joint, comprising:
    an input shaft;
    a valve body;
    a valve mechanism enclosed within said valve body for opening and closing a passage for a pressurized fluid in response to an axial movement of said input shaft;
    a hub disposed in front of said valve body and having a base end received in said valve body;
    a valve plunger fitted slidably within said hub;
    a key member extending through said valve body and said hub and engaging said valve plunger, said key member abutting said hub to provide a space between said key and the valve body;
    a push rod having a base end fitted within said hub;
    a front power piston and a rear power piston operable by fluid pressure from said valve mechanism to transmit a thrust to said push rod;
    a surface of said key member facing said push rod being spaced apart from said valve body to form a clearance therebetween to keep said valve body and said surface of said key member apart from each other.

11. The toggle joint as claimed in claim 10 further comprising a holding ring for holding said key member down to said valve body, said key member having a bifurcated engaging portion which extends through said valve body and said hub, said bifurcated engaging portion engaging a reduced diameter portion of said valve plunger.

12. The toggle joint as claimed in claim 11 wherein said key member has a bent portion folded from said bifurcated engaging portion as well as a pair of arcuate portions which extend from opposite ends of said bent portion along a circumference of said valve body.

13. The toggle joint as claimed in claim 12 wherein said holding ring has a C-shaped body, a holding portion formed at each end of said C-shaped body, and a pair of engaging portions formed on said C-shaped body so as to extend axially of said valve body and grooves formed on an end surface of said valve body, said ring being fitted on said valve body so as not to be rotatable relative thereto.

* * * * *